(12) United States Patent
Berger

(10) Patent No.: US 8,820,372 B2
(45) Date of Patent: Sep. 2, 2014

(54) TIRE TREAD COMPRISING INCISIONS AND RECESSES

(75) Inventor: Eric Berger, Loubeyrat (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 546 days.

(21) Appl. No.: 13/132,833

(22) PCT Filed: Dec. 2, 2009

(86) PCT No.: PCT/EP2009/066213
§ 371 (c)(1),
(2), (4) Date: Aug. 17, 2011

(87) PCT Pub. No.: WO2010/063750
PCT Pub. Date: Jun. 10, 2010

(65) Prior Publication Data
US 2012/0006458 A1    Jan. 12, 2012

(30) Foreign Application Priority Data
Dec. 5, 2008  (FR) ..................................... 08 58299

(51) Int. Cl.
*B60C 11/12* (2006.01)
*B60C 11/117* (2006.01)

(52) U.S. Cl.
USPC ............ 152/209.17; 152/209.18; 152/209.25; 152/DIG. 3

(58) Field of Classification Search
CPC .. B60C 11/032; B60C 11/0323; B60C 11/12; B60C 11/1281; B60C 2011/1254; B60C 2011/1268; B60C 2011/1286
USPC ............ 152/209.18, 209.25, DIG. 3, 209.17, 152/209.21
See application file for complete search history.

(56) References Cited

U.S. PATENT DOCUMENTS 2,121,955 A * 6/1938 Eger ......................... 152/209.18
5,109,901 A * 5/1992 Miyamoto et al. ........ 152/209.18
(Continued)

FOREIGN PATENT DOCUMENTS

EP   0 820 886 A2   1/1998
EP   1 676 695 A2   7/2006
(Continued)

OTHER PUBLICATIONS

International Search Report mailed Mar. 3, 2010 for International Patent Application No. PCT/EP2009/066213.

*Primary Examiner* — Steven D Maki
*Assistant Examiner* — Robert Dye
(74) *Attorney, Agent, or Firm* — Dickinson-Wright PLLC

(57) ABSTRACT

Tire tread comprising a plurality of elements forming relief, each element comprising a contact face, a plurality of elements of the tread being provided with at least one incision, this incision opening onto the contact face in order to form second edges parallel with one another and with an average orientation at most equal to 45° with the direction of the axis of rotation of the tire provided with this tread, each incision also opening onto two lateral surfaces of the element so as to form strips having a length L and a width d, this width d being less than the length L, each strip comprising at least one cavity entirely contained in the strip and of which the largest dimension is oriented so as to be in the direction of the length of the strip inside which it is formed, each cavity having a length Lc, measured along its largest dimension, which is between 10% and 90% of the length L of the strip, the total of the lengths Lc of all the cavities of one and the same strip being more than 10% of the length L of the said strip.

12 Claims, 3 Drawing Sheets

(56) References Cited

U.S. PATENT DOCUMENTS

| | | | |
|---|---|---|---|
| 6,116,310 A | 9/2000 | Shinohara | |
| 6,408,910 B1* | 6/2002 | Lagnier et al. | 152/209.17 |
| 7,017,634 B2* | 3/2006 | Radulescu et al. | 152/209.21 |
| 7,416,004 B2* | 8/2008 | Koya | 152/209.17 |
| 7,793,692 B2* | 9/2010 | Nguyen et al. | 152/209.21 |
| 2006/0144491 A1 | 7/2006 | Nguyen et al. | |
| 2008/0295937 A1* | 12/2008 | Ohashi | 152/209.21 |

FOREIGN PATENT DOCUMENTS

| | | | |
|---|---|---|---|
| FR | 2055628 | * | 5/1971 |
| GB | 511271 | | 8/1939 |
| JP | 2-310108 A | | 12/1990 |
| JP | 2001-121926 A | | 5/2001 |
| JP | 2006-298057 | * | 11/2006 |

* cited by examiner

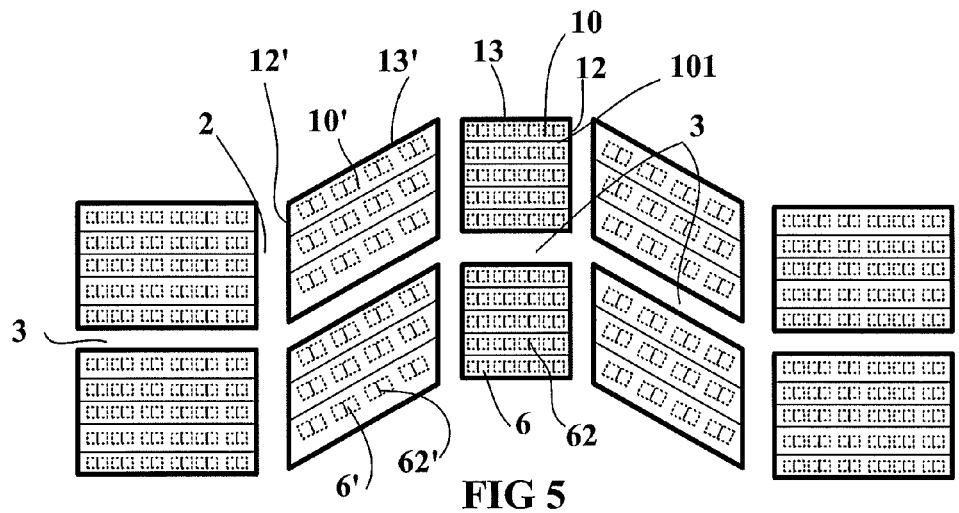
FIG 5
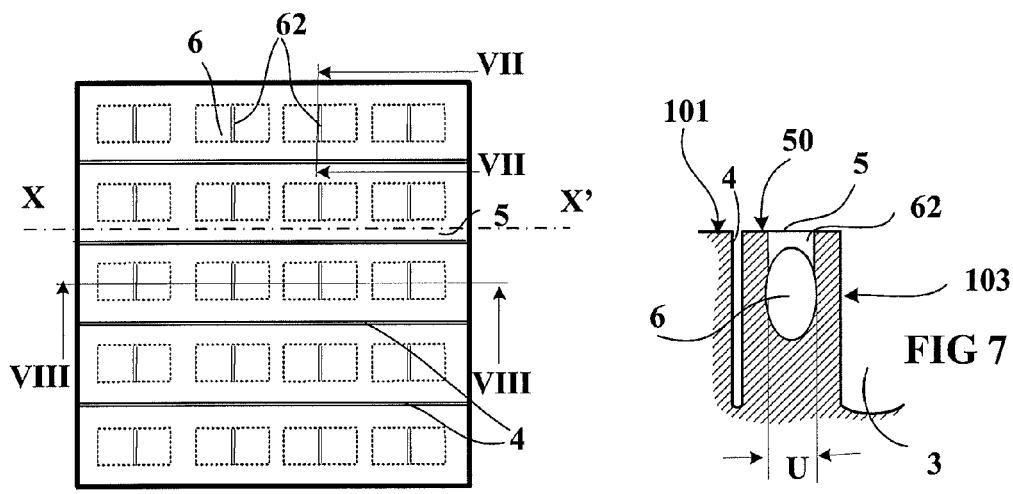
FIG 6
FIG 7
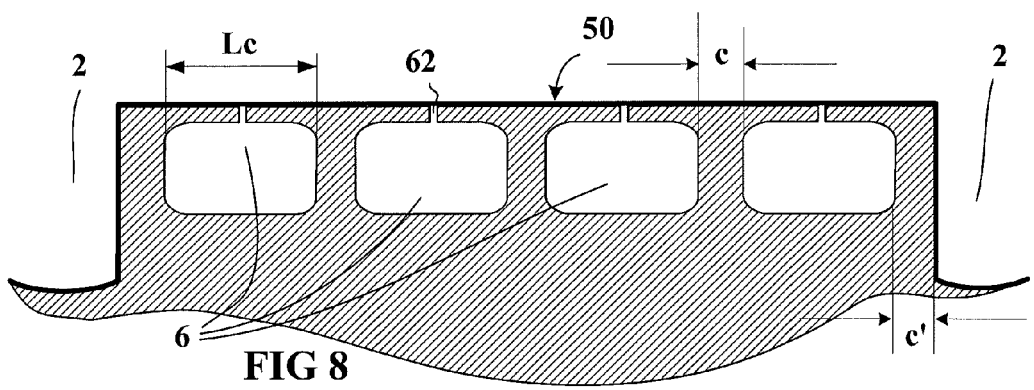
FIG 8

TIRE TREAD COMPRISING INCISIONS AND RECESSES

The invention relates to tire treads and more particularly to treads provided with a plurality of incisions and designed notably to be fitted to tires for winter running.

A tire tread comprises a running surface designed to come into contact with the road surface when running. It is known practice to provide this tread with grooves of generally circumferential orientation and generally transverse orientation (parallel to the axis of rotation) in order to promote drainage of the water that is present in rainy weather on the road surface. These grooves delimit a plurality of elements of material (blocks, ribs), each of these elements comprising a contact face in order to come into contact with the road surface, lateral faces cutting the contact face along edges. "Circumferential direction" means a direction tangential to a circle the centre of which is on the axis of rotation of the tire provided with the tread.

In order to increase the running performance in rainy weather on a road surface covered with a film of water, it is known practice to also provide elements of the tread with at least one incision the average width of which is substantially less than the width of the grooves and usually less than 1 mm, so as not to excessively reduce the quantity of material. These incisions may be oriented transversely and/or circumferentially.

On each element of material of the tread, these incisions delimit several strips of material the edges of which with the contact face are used to cut the film of water that is present on a road surface and establish contact with the said road surface. It has been found that, despite producing incisions, a limit of effectiveness of the additional edges created by the incisions was reached. Too great an increase in the number of incisions in one and the same element of material is not satisfactory to push the limits since this increase at the same time softens the tread element which can reduce performance in running conditions on a dry road surface.

Specifically, the incisions oriented transversely and running totally across the block delimit strips of rubber having a great slenderness (that is to say a great length and a great height for a narrow width relative to this length and height). It has therefore been found that the contact pressures in the vicinity of the created edges were not sufficient to obtain an appropriate technical effect. One object of the invention is to increase the contact pressures between the tread and the road surface in the vicinity of the transverse edges formed on relief elements.

Although this arrangement seems to be of value since it uses a great length of transverse edges, it can still be improved by the tread according to the invention which makes it possible to optimally adapt the contact pressures in the vicinity of the transverse edges for any type of running (dry ground and wet ground) by accentuating the mechanical effect of the edges.

The tire tread of the invention comprises a plurality of elements forming relief, each element being delimited by grooves of depth H. Each element comprises a contact face designed to be in contact with the road surface and lateral faces cutting the contact face along first edges; certain of these edges are oriented transversely, that is to say in a direction forming an angle at most equal to 45° with the direction of the axis of rotation of the tire provided with this tread. Moreover, a plurality of elements of the tread are provided with at least one incision of depth P (this depth may be equal to, less than, greater than the depth H of the grooves), this incision opening onto two lateral faces and onto the contact face in order to form second edges parallel with one another and with an average orientation at most equal to 45° with the direction of the axis of rotation of the tire provided with this tread. These incisions form strips having a length L and a width d, this width d being less than the length L. Each strip comprises at least one cavity entirely contained in the strip, that is to say that this cavity does not open onto any of the faces of the said strip. The largest dimension of each cavity is oriented so as to be parallel to the direction of the length of the strip inside which it is formed, each cavity having a length Lc, measured along its largest dimension, which is between 10% and 90% of the length L of the strip. Moreover, the total of the lengths Lc of all the cavities of one and the same strip is more than 10% of the length L of the said strip, for the purpose of substantially increasing the contact pressures along the first edges of the element and along the second edges formed by the incisions with which the said element is provided.

Advantageously this invention applies to tire treads for winter use for which the incisions form strips having a length L and a width d, this width d being at most equal to 50% of the length L.

According to a preferred variant, the proposed tread is such that the total of the lengths Lc of all the cavities of one and the same strip is more than 50% of the length L of the said strip.

Yet more preferably, the proposed tread is such that the total of the lengths of all the cavities of one and the same strip is more than 80% of the length of the said strip and in that the width of each cavity is more than 80% of the width d of the said strip, nevertheless without opening onto any of the lateral faces of the strip.

In order to obtain an effect for the tread in the new state, it is advantageous for the cavities of one and the same strip to be situated, relative to the contact face of the element, at a depth of between 10% and 50% of the depth H of the grooves.

Yet more advantageously, the minimum distance between each cavity and the contact face of the element is between 20% and 30% of the depth H of the grooves.

Practically, these cavities can be molded on the internal face of the tread, that is to say on the innermost face of the tread and therefore the face furthest from the contact face of the said strip. For this molding of a tread according to the invention, it is possible to mould incisions extended by cavities and then fit this molded strip onto a tire blank. According to this embodiment, the cavities formed inside each strip of a relief element allow the contact pressure distributions to be modified in the vicinity of the first edges of the element and of the second edges formed by the transverse incisions.

In an equivalent embodiment, each cavity of a strip is extended towards the contact face of the strip by an incision with a width of less than 1 mm and with a length substantially equal to the transverse dimension of the said cavity, this incision not opening onto any lateral face of the strip and being oriented in a direction substantially perpendicular to the direction of the second edges. This advantageous variant of the invention naturally allows easier molding of the cavities without however adding transverse incisions. Consequently, it is possible not to substantially modify the rigidity of each strip under a force directed in the direction of movement of the tire (either under driving force or under braking force).

In order to limit the reduction in longitudinal rigidity in shear of the elements of the tread, each incision extending a cavity has a length of between 20% and 80% of the width d of the strip. The length Lc of the cavity extending each longitudinal incision is advantageously between 0.5 and 1.5 times the longitudinal length of this incision.

Advantageously, each strip having a total volume Ve, computed as the volume of material contained between the various faces delimiting the said strip and over a height equal to the smallest of the depths H and P, the total of the volumes of the cavities of one and the same strip is at least equal to 20% and at most equal to 80% of the total volume Ve of the said strip.

Yet more advantageously, the total of the volumes of the cavities of one and the same strip is at least equal to 40% and at most equal to 60% of the total volume Ve of the said strip.

In another variant, each cavity of a strip is extended towards the inside of the tread by an incision with a width of less than 1 mm, the latter itself being extended by another cavity. In this variant, it is possible to find, after a partial wearing of the tread, an operation substantially equal to that of the tread in the new state. The incision formed between two cavities is oriented in a direction perpendicular to the transverse direction of the strip.

Preferably, each cavity has an elongate shape in a direction perpendicular to the mid-plane of the incision that it extends and may have, seen in section, a section chosen from the following shapes: circular, elliptical, triangular or rectangular. Advantageously, the cavities are of cylindrical shape with circular section of diameter r (equal in the present case to the smallest dimension U of the cavity), this diameter being at most equal to the length Lc of the cavity.

The dimensions of each cavity are such that the area of its section (in a sectional plane perpendicular to the transverse direction) is between 20% and 80% of the area of the section of the strip of rubber in which it is formed. This section of the strip is taken in a sectional plane perpendicular to the transverse direction and is measured between the contact face of the strip and a depth equal to the depth H of the grooves. Preferably, the surface of the section of each cavity is substantially equal to 50% of the surface of the section of the strip.

This same invention may equally be applied to the case of a tread in which the sculpture elements are particularly flexible because of their great slenderness. "Great slenderness" of an element in this instance means that at least one dimension of the contact face of these elements is small compared with the depth of the grooves or incisions delimiting each element.

Other features and advantages of the invention emerge from the following description made with reference to the appended drawings which show, as non-limiting examples, embodiments of the subject of the invention.

FIG. 5 shows a view of the running surface of a tread according to the invention, each element comprising a plurality of strips and, inside each strip, a plurality of cavities, these cavities extending towards the running surface through incisions;

FIG. 6 shows an element of the central portion of the tread shown in FIG. 5;

FIG. 7 shows a view in section along the line VII-VII of the element of FIG. 6;

FIG. 8 shows a view in section along the line VIII-VIII of the element of FIG. 6;

In order to make the figures and the description easier to read, one and the same reference is used in the figures when it designates one and the same functional and/or structural element.

Figure 1:
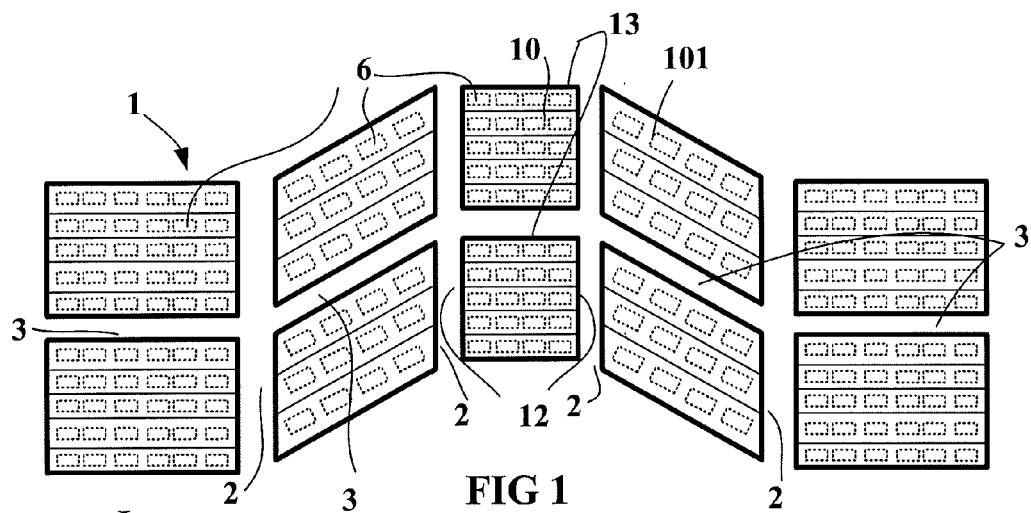
FIG. 1 shows a view of the running surface of a tread according to the invention, each element comprising a plurality of strips and, inside each strip, a plurality of cavities.

FIG. 1 shows a view of the running surface 100 of a tread 1 according to the invention, this tread comprising a plurality of grooves 2 of circumferential (or else longitudinal) orientation and transverse grooves 3, these grooves having one and the same depth H. The transverse grooves 3 are oriented so as to make, with the axis of rotation of the tire provided with the said tread, an angle of zero or at most equal to 45°. By definition, in what follows, a direction is said to be transverse when it makes an angle at most equal to 45° with the direction of the axis of rotation of the tire. The tread comprises a running surface designed to come into contact with the road surface and an internal surface designed to be connected to the rest of the tire. The circumferential and transverse grooves delimit elements 10 comprising a contact face 50 and lateral faces cutting the running surface along first edges 12, 13, certain of these edges being of circumferential orientation and the others of transverse orientation.

Figure 2:
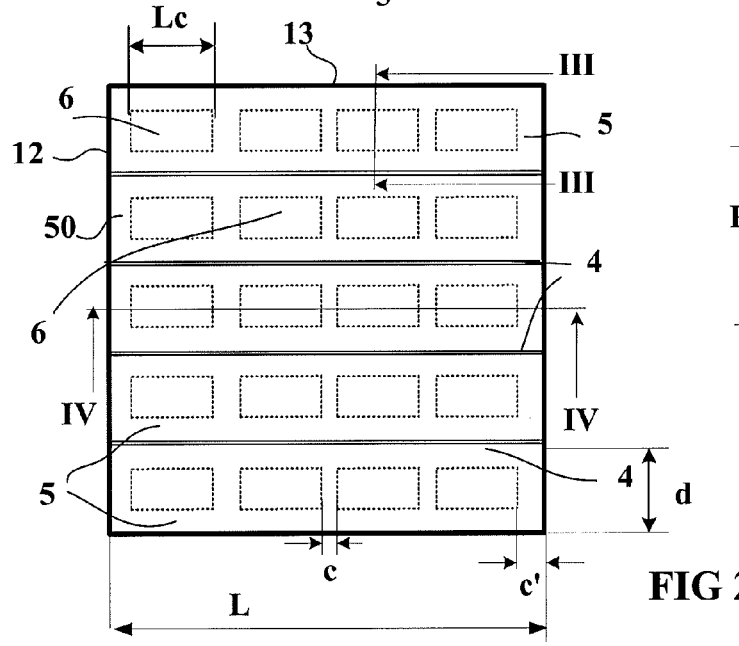
FIG. 2 shows an element of the central portion of the strip shown in FIG. 1.

FIG. 2 shows that an element 10 is cut by several transverse incisions 4 of a depth P equal to the depth H of the grooves, these incisions opening both onto the contact face 101 of the element 10 and onto two lateral faces of the element. Each element of the tread is consequently divided into a plurality of strips 5 of material a large dimension of which corresponds to the length L of the strip and a direction perpendicular to this length is the width d of the said strip. In the case presented, all the strips 5 have widths d equal to one another, but naturally these widths can be different in one and the same element or in distinct elements. All the strips in this instance have a height equal to H.

Inside each strip 5 is formed a plurality of cavities 6 of cylindrical shape of diameter r and with a larger dimension Lc greater than the diameter r.

Figure 3:
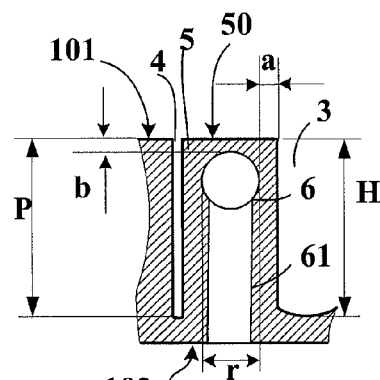
FIG. 3 shows a view in section along the line of the element of FIG. 2.

In the section made along a line corresponding to a sectional plane perpendicular to the axis of rotation and shown in FIG. 3, there is a strip 5 of width d delimited by a groove 3 and by an incision 4, and inside this strip 5 a cavity 6 extended towards the internal surface 102 of the tread by an incision 61 making molding of this cavity easier. The cavities 6 are all formed at one and the same level in the strip 5 so as to be at a distance b from the contact face of the strip which in the present case, is equal to 10% of the depth P of the incisions of an element. This distance b corresponds to the thickness of material situated between the cavity and the contact face 100 of the strip 5 in the new state.

The minimum distance a separating the cavities from the transverse lateral faces of a strip 5 is between 10% and 50% of the width d of the strip and, in the present case, this minimum distance is equal to 25% of the said width d.

Figure 4:
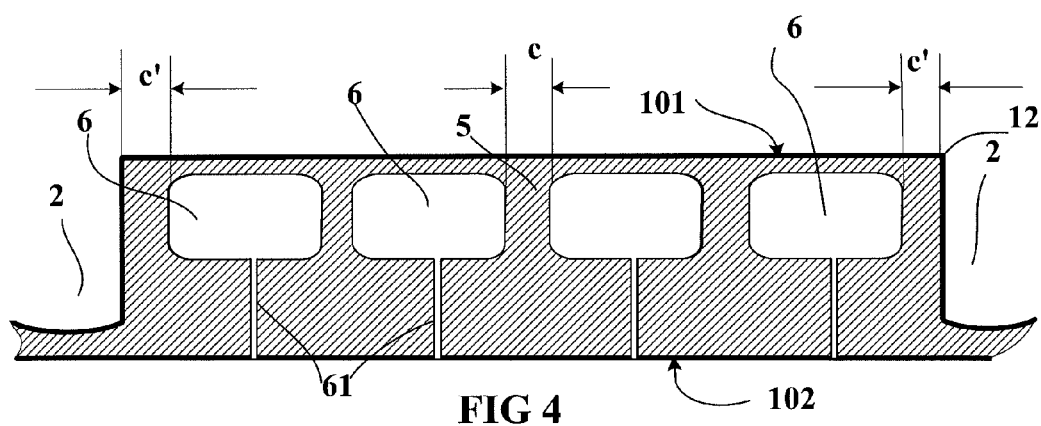
FIG. 4 shows a view in section along the line IV-IV of the element of FIG. 2.

In the section made along a line IV-IV corresponding to a sectional plane containing the axis of rotation and shown in FIG. 4, four cavities 6 are each extended by an incision 61 opening onto the internal surface 102 of the tread. These cavities are placed so as to be separated from one another by a distance c substantially equal to 1:25 of the length L of the strip in which they are formed. Moreover, the cavities closest to the lateral faces are at a distance c' from these faces substantially equal to 1:25 of the length L of the strip.

FIG. 5 shows a tread similar to that shown in FIG. 1, the only difference lying in the fact that each cavity 6 is extended by an incision 62, not towards the inside of the tread, but towards the running surface of the tread. This incision 62 does not open onto any lateral face of the strip 5. Moreover, this incision 62 is oriented in a direction that is not the transverse direction.

FIG. 6 shows an element 10 of the middle portion of the tread of FIG. 5 comprising four transverse incisions 4 opening onto two lateral faces and delimiting five strips 5 of length L and of width d. The length of these strips 5 extends in a direction parallel to the direction XX' corresponding to the direction of the axis of rotation of the tire provided with this tread.

In FIG. 7, showing a section in a plane perpendicular to the axis of rotation and the trace of which is shown by the line VII-VII in FIG. 6, there is a strip 5 delimited by a groove of depth H and an incision of depth P and, inside this strip, a cavity 6 of elliptical section. This cavity 6 is extended towards the running surface by a small incision 62 with an orientation substantially perpendicular to the axis of rotation and with a length equal to the width U of the cavity in this sectional plane.

In FIG. 8, showing a section in a plane containing the axis of rotation and the trace of which is shown by the line VIII-VIII in FIG. 6, there are four cavities 6 extended towards the running surface by incisions 62 with a width substantially equal to 0.6 mm.

This same variant exhibits elements 10', in the intermediate portions of the tread, that have first circumferential edges 12' and others 13' that are transverse, the latter edges 13' making an angle equal to 30° with the axis of rotation XX'. In this example, the incisions 62' extending the cavities 6' are inclined relative to the circumferential direction (the direction perpendicular to the axis XX') at an angle equal to 30°. It is considered in this case that the transverse component of these small incisions 62' does not substantially disrupt the rigidity of the tread in the direction parallel to the axis of rotation.

Figure 9:
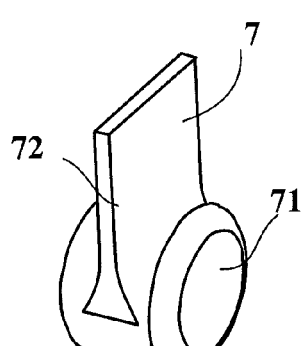
FIGS. 9 to 12 show variants of molding elements used for the molding of the cavities of a tread as shown in FIG. 5.

FIGS. 9 to 12 show various variants of molding elements 7 designed to mould the extended cavities of incisions in a tread according to the invention. FIG. 9 shows a molding element 7 comprising a cylindrical body 71 with an axis XX' supporting a strip 72 perpendicular to the axis XX'.

Figure 10:
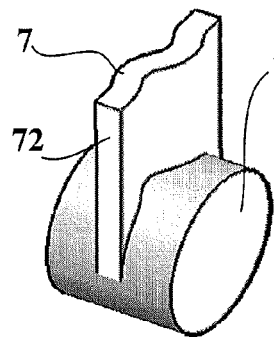

In the variant of FIG. 10, the cylindrical body 71 of the molding element 7 is of corrugated shape around a direction perpendicular to the axis XX' of the cylindrical body.

Figure 11:
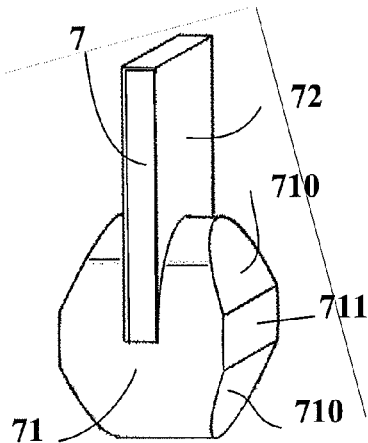

The variant of FIG. 11 comprises a body 71 of generally cylindrical shape and having at its ends inclined surfaces 710 joined together by a surface 711 perpendicular to the axis XX'.

Figure 12:
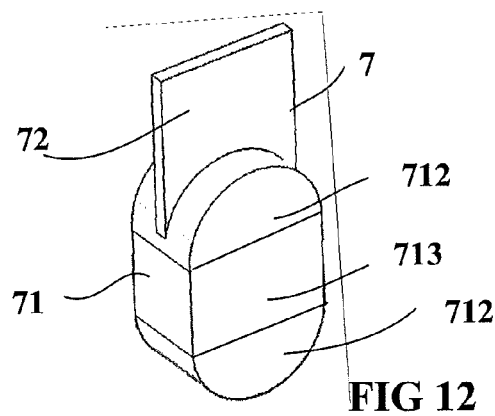

The last variant shown in FIG. 12 comprises a body 71 formed by two cylindrical half-portions 712 connected together by a cylindrical portion 713.

Figure 13:
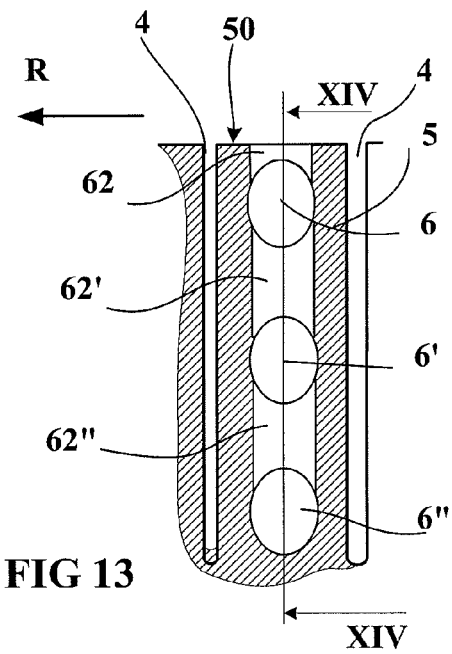
FIG. 13 and FIG. 14 show in section on two planes perpendicular to one another a variant embodiment according to which each strip comprises several cavities on top of one another in the direction of the thickness of the tread.
Figure 14:
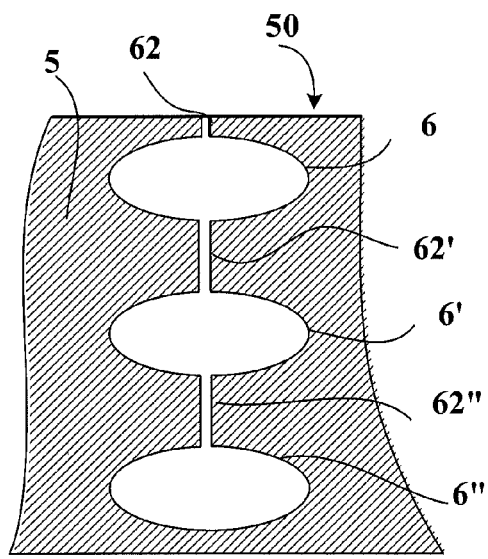

Another variant embodiment of the tread according to the invention is shown with FIGS. 13 and 14. These FIGS. 13 and 14 show views in section, these sections being made in two mutually perpendicular planes, of a variant embodiment according to which each strip of the tread comprises several cavities placed one above the other in the direction of the thickness of the tread.

FIG. 13 shows three cavities 6, 6', 6", each of these cavities being extended in the direction of the running surface by an incision 62, 62', and 62" respectively. It can be seen in the plane of FIG. 14 that these cavities have sections of oval shape. The arrow R indicates the direction of rotation of the tire, that is to say the circumferential direction.

The invention is not limited to the examples described and shown and various modifications can be made thereto without departing from its context.

The invention claimed is:

1. A tread for a tire having an axis of rotation, the tread comprising:
   a plurality of grooves of depth H, each defined by two walls;
   a plurality of elements forming a relief and delimited by the walls of the grooves, each element comprising:
      a contact face that during running of the tire is in contact with the road surface, and
      lateral faces formed by walls of the grooves, and cutting the contact face along first edges,
   wherein a plurality of the elements of the tread further comprise at least one first incision of depth P, wherein each first incision:
      does not extend from a cavity within the element,
      opens onto the contact face, thereby forming second edges oriented parallel with one another and having an average orientation forming an angle at most equal to 45° with a direction of the axis of rotation of the tire
      opens onto two lateral faces of the element in which it is formed, thereby forming strips, each strip comprising:
         a length L,
         a width d, wherein d is less than L,
         a total volume Ve, and
         at least one cavity contained within the strip such that the cavity does not itself open onto any faces of the strip, and comprising a length Lc which is the largest dimension of the cavity, which is oriented in the direction of the length of the strip inside which it is formed, and which is between 10% and 90% of the length L of the strip, and comprising a sectional area in a sectional plane perpendicular to a transverse direction of the strip that is between 20% and 80% of the area of the section of the strip in which the cavity is formed, thereby substantially increasing contact pressures along the first and second edges.

2. The tread according to claim 1, wherein the total of the lengths Lc of the at least one cavity of one and the same strip is more than 50% of the length L of the said strip.

3. The tread according to claim 1, wherein the total of the lengths Lc of the at least one cavity of one and the same strip is more than 80% of the length L of the said strip and in that the width of each cavity is more than 80% of the width d of the said strip.

4. The tread according to claim 1, wherein the at least one cavity of one and the same strip is situated at a depth beneath the running surface of between 10% and 50% of the depth H of the grooves.

5. The tread according to claim 1, wherein each strip comprising a cavity further comprises a second incision:
   extending from the cavity toward the contact face of the strip without opening onto any lateral face of the strip,
   being oriented in a direction substantially perpendicular to the direction of the second edges, and
   comprising a width of less than 1 mm and a length substantially equal to a transverse dimension of the cavity from which it extends.

6. The tread according to claim 5, wherein the length Lc of the cavity having an incision extending between the cavity and the contact face is advantageously between 0.5 and 1.5 times the length of this incision.

7. The tread according to claim 1 wherein the at least one cavity has a volume whereby the total of the volumes of the at least one cavity of one and the same strip is at least equal to 20% and at most equal to 80% of the total volume Ve of the strip.

8. The tread according to claim 7 wherein the total of the volumes of the at least one cavity of one and the same strip is at least equal to 40% and at most equal to 60% of the total volume Ve of the said strip.

9. The tread according to claim 1 wherein each cavity is of cylindrical shape with a circular section with a diameter r.

10. The tread according to claim 1 wherein each cavity of a strip is extended towards the inside of the tread by an incision with a width of less than 1 mm, the latter itself being extended by another cavity.

11. The tread according to claim 1, wherein the width d of the strips is at most equal to 50% of the length L of the strips.

12. The tread according to claim 1, wherein the width d of the strips is at most equal to 10% of the length L of the strips.

\* \* \* \* \*